Figure 1:
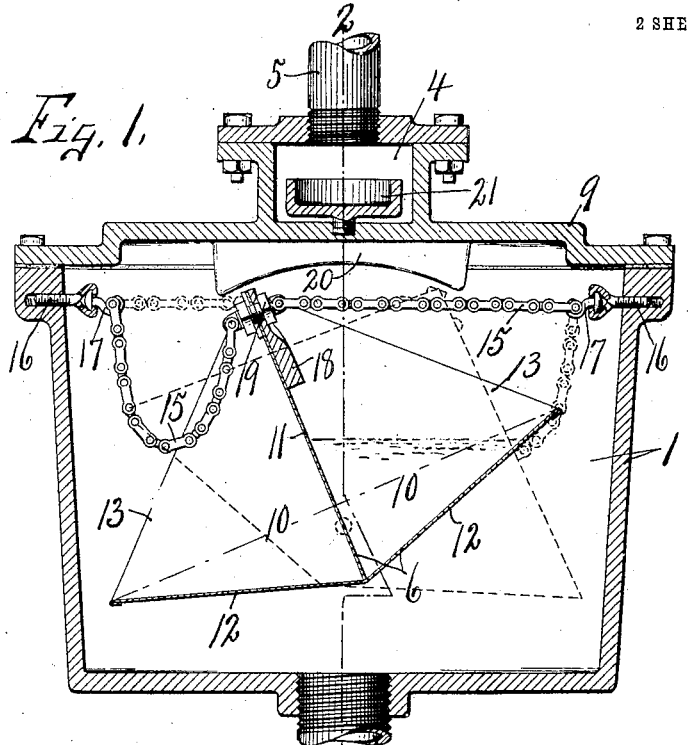

No. 846,112. PATENTED MAR. 5, 1907.
W. A. KITTS.
STEAM METER.
APPLICATION FILED JULY 27, 1906.

2 SHEETS—SHEET 1.

Witnesses:
F. E. Arthur
H. E. Hare

Inventor.
W. A. Kitts.
By
Howard P. Denison
Attorney.

THE NORRIS PETERS CO., WASHINGTON, D. C.

No. 846,112. PATENTED MAR. 5, 1907.
W. A. KITTS.
STEAM METER.
APPLICATION FILED JULY 27, 1906.
2 SHEETS—SHEET 2.
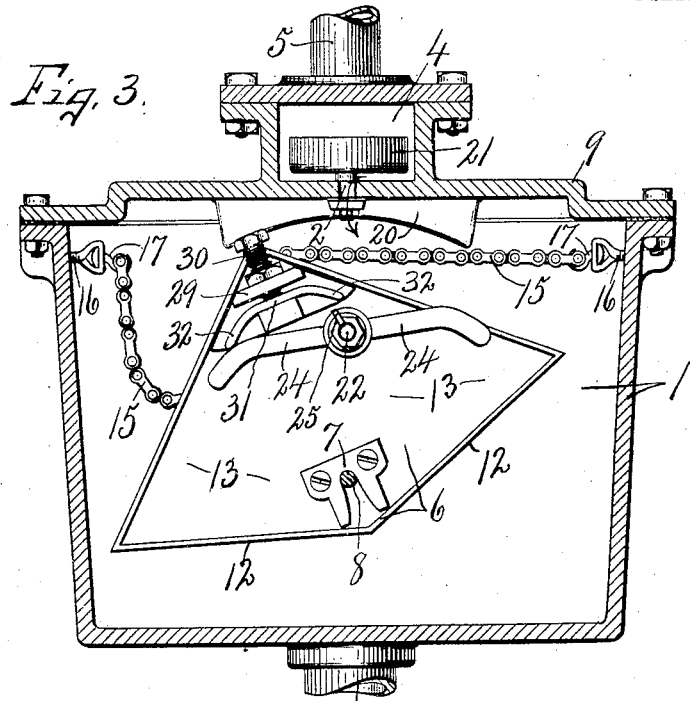
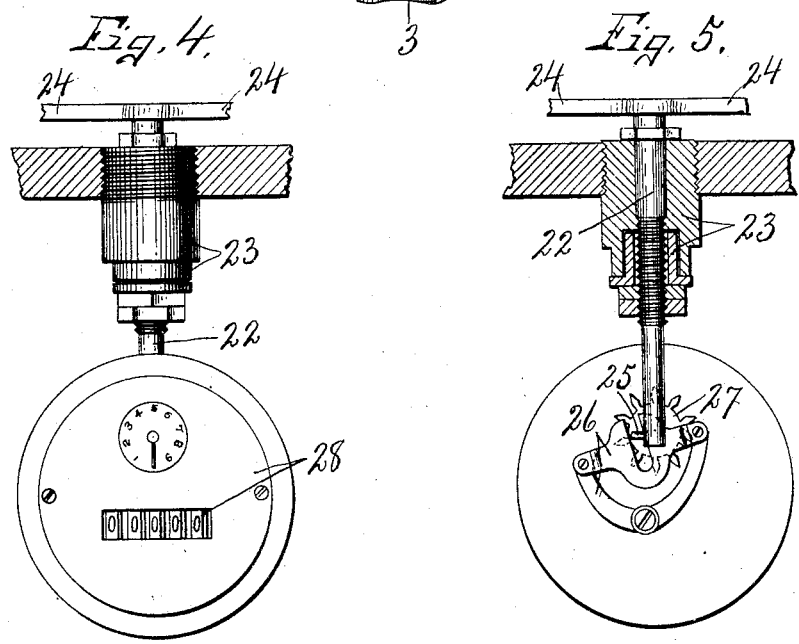
Witnesses
F. E. Arthur
H. E. Chase
Inventor
W. A. Kitts
By Howard P. Denison
Attorney

UNITED STATES PATENT OFFICE.

WILLARD A. KITTS, OF OSWEGO, NEW YORK, ASSIGNOR TO KITTS MANUFACTURING COMPANY, OF OSWEGO, NEW YORK, A CORPORATION OF NEW YORK.

STEAM-METER.

No. 846,112.  Specification of Letters Patent.  Patented March 5, 1907.

Application filed July 27, 1906. Serial No. 328,031.

*To all whom it may concern:*

Be it known that I, WILLARD A. KITTS, of Oswego, in the county of Oswego, in the State of New York, have invented new and useful Improvements in Steam-Meters, of which the following, taken in connection with the accompanying drawings, is a full, clear, and exact description.

This invention relates to certain improvements in steam-meters involving the use of a closed receptacle having separate inlets in its top and an outlet in its bottom, said receptacle containing a pair of tilting buckets movable laterally into registration with the inlet-opening, each bucket receiving a predetermined quantity of water of condensation whereby the buckets are tilted to discharge accumulated water therefrom, the tilting of the buckets in either direction operating a suitable counter to indicate the number of discharges by which the exact amount of steam consumed may be determined.

My object is to produce a simple, practical, and efficient meter of the class described without the use of dash-pots or other complicated power-consuming devices so as to produce a free tilting action of the buckets from one extreme to the other and to utilize this tilting action for the operation of a counter to produce a closer measurement of the steam actually consumed.

Another object is to provide an adjustable connection between the tilting buckets and counter mechanism for the purpose of taking up any wear and to assure a positive full movement of the counter at each tilting operation.

Another object is to reduce resistance at the initial or starting movement of the buckets to a minimum and to utilize the momentum of the moving bucket when discharging its water content to operate the counter.

A still further object is to provide adjustable limiting stops or connections for the buckets, so as to allow them to tilt to various angles, and thereby vary the quantity of water which each will receive before discharging.

A further object is to provide the buckets with open-sided bearings, so as to permit them to be readily removed when the cap of the receptacle is taken off, and to provide means on the receptacle to prevent displacement of the buckets from their bearings when in operative position.

A further object is to provide a guard or shield above the inlet-opening to prevent malicious interference by wires or other instruments with the interior mechanism, thereby obviating fraudulent use of the meter.

Other objects and uses will appear in the following description.

Figure 2:
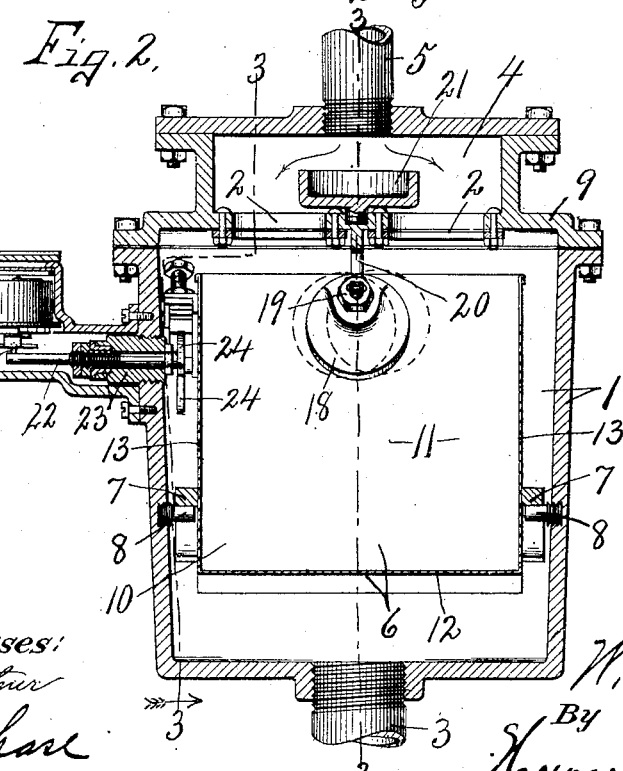

In the drawings, Figures 1 and 2 are sectional views taken, respectively, on lines 1 1, Fig. 2, and 2 2, Fig. 1. Fig. 3 is a sectional view taken on line 3 3, Fig. 2. Figs. 4 and 5 are respectively top plan and inverted plan of the detached counter mechanism and its operating means, the bearing for the spindle being shown in top plan in Fig. 4 and in section in Fig. 5.

In demonstrating the practicability of my invention I have shown a closed chamber 1 as provided with comparatively small inlets 2 in its top and an outlet 3 in its bottom, the inlets 2 connected with a superposed chamber 4, having an inlet-conduit 5, through which the water of condensation may pass first into the chamber 4 and thence through the inlets 2 into an underlying measuring-receptacle 6, presently described. This receptacle is located within the chamber 1 wholly below the openings 2 and is preferably provided with bearings 7, opening from the bottom upward for receiving pins or bearings 8, the purpose in leaving the lower sides of the bearings open being to permit the receptacle to be removed through the top of the chamber 1 when its cap, as 9, is removed.

The receptacle 6 is provided with opposed similar water-receiving pockets 10 each of substantially the same capacity, said pockets being separated by a vertical partition 11, and are provided with upward-diverging bottom plates 12, which meet at the lower edge of the partition 11, forming an obtuse angle with each other and each form an acute angle with the partition, said bottom plates 12 being of substantially the same area and are connected at the ends with the partition 11 by end plates 13. These end plates 13 are substantially coextensive with the transverse plane between the bottom 12 and partition 11, so that their outer edges preferably lie in direct lines between the edges of the bottom plates 12 and upper edge of the partition 11.

The pins 8 constitute pivotal bearings upon which the receptacle 6 may swing laterally in opposite directions to alternately bring the upper open side of each pocket 10 into registration with or directly under the inlet-openings 2, which latter terminate within the vertical plane of the end plates 13, so that all of the water of condensation passing through the inlets 2 is discharged into the underlying pocket 10, which may be in registration with said openings.

The pivotal pins 8 are located in the same plane as the central partition 11 between its upper and lower edges and preferably below a direct line drawn between the outer edges of the bottom plates 12, as indicated in Fig. 1, or some distance below the horizontal plane of the outer edge of one of the buckets when in position to receive the water of condensation, so that a portion of such water will be between a vertical plane drawn through said pivots and the partition 11, while the predominance of water relied upon to overbalance and automatically tilt the receptacle 6 will be at the outside of said vertical plane. By this arrangement I am enabled to obtain a positive yet easy operation of the tilting receptacle without excessive jar or necessity for the use of retarding dashpots or other buffers.

The tilting receptacle is adjusted so that at each tilting movement each bucket is brought into position to receive a predetermined quantity of water before automatically discharging, and in order that the tilting receptacle may be adjusted to receive any predetermined quantity of water of condensation within certain limits I connect the upper portion of the partition 11 or receptacle 6 to opposite sides of the chamber 1 by means of flexible or jointed connections 15 and adjusting-screws 16, the latter being engaged with threaded aperture-opening from the inner opposite faces of the chamber, while the flexible connections 15 are attached to hooks 17, which are swiveled in the inner ends of the adjusting-screws 16.

The flexible connections 15 preferably consist of chains, and one of the links of each may be detachably connected to the hooks 17, so as to regulate the degree of movement of the tilting receptacle 6, and thereby regulate the amount of water which each pocket will retain before tilting the receptacle to discharge such water. These adjustable connections are inaccessible from the outside of the chamber 1 and can only be adjusted by removing the cap, as 9.

In order to vary the resistance which must be overcome by the weight of the water in one of the pockets 10 before tilting, a weight 18 is adjustably mounted upon the upper portion of the partition 11, so as to swing vertically, said weight being held in its adjusted position by a clamping-nut 19.

As previously stated, the receptacle 6 is removable vertically from the bearings 8 when the cap 9 is removed, and in order that such receptacle may not be accidentally displaced while handling or shifting I provide the cap 9 with an inwardly-projecting central rib 20, having its inner faces concentric with the swinging axis of the receptacle 6 and sufficiently close to the upper edge of the partition 11 to prevent the open-sided bearings 7 from disengagement with the pins 8, sufficient clearance being left between the lower face of the rib 20 and upper edge of the partition 11 to permit free tilting movement of the receptacle 6 without friction with the rib.

A shield or guard 21 is supported in the chamber 4 between the inlet-conduit 5 and openings 2 to prevent the insertion of a wire or other instrument through the openings 2 whereby the interior mechanism might be maliciously tampered with.

The counter-operating mechanism, which is actuated by each tilting movement of the receptacle 6, consists, essentially, of a rock-shaft 22, which is journaled in a stuffing box or gland 23 in the case 1 at one end of the receptacle 6 and is provided at its inner end with opposite radially-projecting arms 24, while its outer end is provided with a radially-projecting stud 25, acting upon an oscillatory element 26, similar to an escapement mechanism, which in turn operates a rotary pinion 27 of a counter 28, not necessary to herein further illustrate or describe, for the reason that the counter mechanism, aside from the oscillating shaft or spindle 22, forms no part of my present invention, except in combination with its operating means.

A bracket 29 is secured to one end of the receptacle 6, adjacent to but above the rock-shaft 22, and in this bracket is movable an adjusting-screw 30, carrying at its lower end a plate 31, having its opposite ends deflected downwardly, forming operating-shoulders 32, each engaging the top face of one of the arms 24 as the receptacle 6 is tilted in opposite directions to rock the shaft 22, and thereby actuate the counter mechanism 28 through the medium of the pins 25 and oscillating elements 26.

A certain degree of rocking of the shaft must be made to effect the operation of the counter, and therefore certain portions of the arms 24 are disposed in the path of movement of their respective shoulders 32, which have a limited sliding engagement with the upper edges of said arms 24 to effect such degree of rocking movement; but the extremities of said arms are deflected downwardly in such manner as to assume a position concentric with the swinging axis of the buckets when rocked downwardly by the shoulders 32 a sufficient distance to effect the operation of the counter.

The plate 31 is rigidly locked to the tilting receptacle 6 above the axis of the spindle 22 and arms 24 and is adapted to swing with the receptacle 6 to opposite side of said axis, said plate 31 being so arranged relatively to the arms 24 as to clear the intermediate portion of the arms adjacent to the spindle 22 when the receptacle first begins to tilt from one position to the other in the act of discharging its water content from one of the buckets, so as to remove as far as practicable all resistance and to make the tilting of the bucket dependent wholly upon the weight of water which may accumulate therein. In other words, the shoulders 32 swing clear of the spindle 22 and adjacent portions of the arm 24, so as to alternately engage said arms some distance from their swinging axis as the receptacle 6 is tilted in opposite directions. It is now obvious that when the receptacle 6 is tilted in one direction one of the shoulders 32, pointing in the direction of movement of the upper portion of the receptacle, will engage and depress the adjacent arm 24, thereby rocking the other arm at the opposite side of the spindle 22 upwardly in the path of movement of the adjacent shoulder 32, so as to be engaged and depressed by said shoulder when the receptacle is tilted in the opposite direction, this last operation serving to throw the first-named arm 24 upwardly, so as to be engaged by the first-named shoulder 32 when the receptacle 6 is returned to its starting position, the operation being repeated as often as each bucket is successively filled with a predetermined quantity of water. These successive operations of the receptacle 6 oscillates the spindle 22 in reverse directions, and any suitable counter mechanism may be used which is adapted to be actuated step by step in the same direction at each reverse operation of the actuating-spindle 22, and in view of the fact that the counter indicates the number of such operations and that at each operation a definite quantity of water of condensation, representing a certain amount of steam energy consumed is discharged the total consumption of steam may be readily calculated from the reading of the counter, such calculations being well known to those skilled in the art.

What I claim is—

1. In a steam-meter of the class described, a chamber having an inlet and an outlet, a tilting receptacle within the chamber between the inlet and outlet and provided with buckets movable alternately by the water of condensation accumulating therein into position to receive such water from the inlet, a rock-shaft located in the vertical plane of and above the swinging axis of said receptacle, arms projecting in opposite directions from and secured to said rock-shaft, shoulders on the receptacle above said rock-shaft and movable alternately into engagement with said arms as the receptacle is tilted in opposite directions whereby the rock-shaft is operated first in one direction and next in the opposite direction, a counter mechanism and means on the rock-shaft for actuating said counter mechanism at each reverse movement.

2. In a steam-meter, a closed receptacle having an inlet in its top and an outlet in its base, a tilting receptacle having a lengthwise partition dividing it into equal compartments each open at the top and having bottom plates diverging upwardly from the lower edge of the partition, pivotal bearings for said receptacle located in the plane of the partition below a direct line drawn between the outer edges of said bottom plates, the upper edge of said partition being movable with the receptacle to opposite sides of the vertical plane of the inlet whereby the water of condensation may discharge first into one compartment and then into the other compartment, a rock-shaft located above and in the same vertical plane as said pivotal bearings and provided with oppositely-projecting arms, and shoulders on the receptacle above the rock-shaft and alternately engaging said arms as the bucket is rocked in opposite directions.

3. In a steam-meter, a tilting receptacle having a lengthwise partition dividing it into opposite equal compartments, adjustable limiting-stops and flexible connections between said stops and upper portion of the receptacle whereby the tilting movement of said receptacle may be varied.

4. In a steam-meter, a tilting receptacle having opposite equal compartments open at the top and an inclosing case for said receptacle and opposite flexible connections between said receptacle and opposite sides of the inclosing case.

5. In a steam-meter of the class described, an inclosing case, a receptacle pivotally mounted near its bottom within the case and provided with opposite equal compartments open at the top, said receptacle having an inlet in its top to discharge water of condensation into one of the underlying compartments, flexible connections between said receptacle and opposite sides of the inclosing case, and means for adjusting said connections for stopping the swinging of the receptacle at different positions.

6. In a steam-meter of the class described, an inclosing case having an inlet in its top and an outlet in its base, a tilting receptacle mounted in the case between the inlet and outlet, a rock-shaft located above the swinging axis of the receptacle and provided with oppositely-projecting arms, adjustable shoulders on the receptacle above said arms for alternately engaging the latter to rock the shaft in reverse directions as the receptacle is tilted in opposite directions, and means for adjusting said shoulders.

7. In a steam-meter of the class described, an inclosing case having an inlet in its top and an outlet in its base, a tilting receptacle and open-sided pivotal bearings therefor whereby the receptacle may be removed from the case, said receptacle having opposite similar compartments open at the top and movable alternately into position to receive water of condensation from the inlet, and a rib on the lower face of the top of the case in proximity to the top of the receptacle to prevent upward displacement of said receptacle from its bearings.

In witness whereof I have hereunto set my hand this 17th day of July, 1906.

WILLARD A. KITTS.

Witnesses:
H. E. CHASE,
HOWARD P. DENISON.